US007493725B2

(12) United States Patent
Sampson

(10) Patent No.: US 7,493,725 B2
(45) Date of Patent: Feb. 24, 2009

(54) ARTIFICIAL FISHING LURE

(76) Inventor: Mark Sampson, 26 Reservoir Ave., Needham, MA (US) 02494

( * ) Notice: Subject to any disclaimer, the term of this patent is extended or adjusted under 35 U.S.C. 154(b) by 0 days.

(21) Appl. No.: 11/051,686

(22) Filed: Feb. 4, 2005

(65) Prior Publication Data

US 2005/0172537 A1 Aug. 11, 2005

Related U.S. Application Data

(60) Provisional application No. 60/543,321, filed on Feb. 9, 2004.

(51) Int. Cl.
*A01K 85/00* (2006.01)
(52) U.S. Cl. ...................... 43/42.3; 43/42.24; 43/42.36; 43/42.39
(58) Field of Classification Search .......... 43/42–42.45, 43/43.1, 43.13, 43.2, 44.2, 44.4, 44.6, 44.8
See application file for complete search history.

(56) References Cited

U.S. PATENT DOCUMENTS

| 208,581 | A | * | 10/1878 | Falvey | 43/42.26 |
|---|---|---|---|---|---|
| 440,721 | A | * | 11/1890 | Provoost | 43/44.8 |
| 533,652 | A | * | 2/1895 | Kittle | 43/44.4 |
| 580,915 | A | * | 4/1897 | Welch | 43/44.2 |
| 588,729 | A | * | 8/1897 | Harris | 43/42.39 |
| 772,807 | A | * | 10/1904 | Ketchum | 43/44.2 |
| 823,319 | A | * | 6/1906 | Cooper | 43/44.8 |
| 994,927 | A | * | 6/1911 | Jefferson | 43/42.36 |
| 1,208,936 | A | * | 12/1916 | England | 43/44.2 |
| 1,246,150 | A | * | 11/1917 | Parr | 43/44.4 |
| 1,247,955 | A | * | 11/1917 | Grube | 43/42.26 |
| 1,267,627 | A | * | 5/1918 | Campbell | 43/42.26 |
| 1,490,161 | A | * | 4/1924 | Dickman | 43/42.36 |
| 1,558,476 | A | * | 10/1925 | Gruenhagen | 43/44.4 |
| 1,613,113 | A | * | 1/1927 | Leu | 43/44.4 |
| 1,620,589 | A | * | 3/1927 | Ackerman | 43/44.8 |
| 1,689,541 | A | * | 10/1928 | Welch | 43/42.3 |
| 1,792,366 | A | * | 2/1931 | Ettles | 43/42.26 |
| 1,813,722 | A | * | 7/1931 | Wright et al. | 43/42.26 |
| 1,908,537 | A | * | 5/1933 | Pflueger | 43/42.26 |
| 1,976,695 | A | * | 10/1934 | Boehm | 43/42.26 |
| 2,025,270 | A | * | 12/1935 | Chaney | 43/42.28 |
| 2,089,605 | A | * | 8/1937 | Hardy | 43/42.26 |
| 2,110,382 | A | * | 3/1938 | Martin | 43/42.36 |
| 2,218,280 | A | * | 10/1940 | Deering | 43/42.26 |
| 2,250,478 | A | * | 7/1941 | Franks | 43/42.3 |

(Continued)

FOREIGN PATENT DOCUMENTS

FR 2672773 A1 * 8/1992

(Continued)

*Primary Examiner*—Darren W Ark
(74) *Attorney, Agent, or Firm*—Neal, Gerber & Eisenberg LLP

(57) ABSTRACT

An embodiment of the present invention involves a fishing lure having a frame, a body formed around the frame with a head end and a tail end, and a weight connected to the frame and formed inside the body. A plurality of appendages extends from the head end. The tail end includes an series of notches arrayed to work in concert to make the tail end flap. A plurality of hooks are attached to the frame, each of the hooks has an end designed to protrude from the body. An eyelet is connected to the frame and protrudes from the body.

5 Claims, 4 Drawing Sheets

U.S. PATENT DOCUMENTS

| | | | | |
|---|---|---|---|---|
| 2,303,097 A * | 11/1942 | Townsend et al. | | 43/42.26 |
| 2,330,517 A * | 9/1943 | Rigandi | | 43/44.8 |
| 2,461,755 A * | 2/1949 | Miller | | 43/44.8 |
| 2,478,655 A * | 8/1949 | Davis | | 43/42.3 |
| 2,509,179 A * | 5/1950 | Warnock | | 43/42.3 |
| 2,523,831 A * | 9/1950 | Koski | | 43/42.3 |
| 2,527,743 A * | 10/1950 | La Rue | | 43/42.3 |
| 2,562,605 A * | 7/1951 | Embree et al. | | 43/44.4 |
| 2,575,797 A * | 11/1951 | Corsi | | 43/42.3 |
| 2,597,792 A * | 5/1952 | Hardy | | 43/42.28 |
| 2,605,572 A * | 8/1952 | Holmgren | | 43/42.3 |
| 2,611,205 A * | 9/1952 | Steel | | 43/42.3 |
| 2,663,964 A * | 12/1953 | Martin | | 43/42.26 |
| 2,718,668 A * | 9/1955 | Burke | | 43/42.24 |
| 2,724,205 A * | 11/1955 | Howard | | 43/42.3 |
| 2,763,085 A * | 9/1956 | Caillier | | 43/42.02 |
| 2,770,063 A * | 11/1956 | Martin | | 43/42.26 |
| 2,787,076 A * | 4/1957 | Kring | | 43/42.36 |
| 2,793,460 A * | 5/1957 | Mutchler | | 43/42.26 |
| 2,819,553 A * | 1/1958 | Fultz | | 43/42.26 |
| 2,847,791 A * | 8/1958 | Simmons | | 43/42.26 |
| 2,867,933 A * | 1/1959 | Stookey | | 43/42.02 |
| 2,910,799 A * | 11/1959 | Wentworth | | 43/42.02 |
| 2,927,393 A * | 3/1960 | Flamisch et al. | | 43/44.2 |
| 2,948,079 A * | 8/1960 | Malchert | | 43/42.39 |
| 2,972,831 A * | 2/1961 | Anselmi | | 43/44.8 |
| 2,972,832 A * | 2/1961 | Anselmi | | 43/44.4 |
| 3,105,317 A * | 10/1963 | Fox | | 43/42.3 |
| 3,284,945 A * | 11/1966 | Kurtis | | 43/44.2 |
| 3,296,734 A * | 1/1967 | Johnson | | 43/42.3 |
| 3,319,371 A * | 5/1967 | Kinnee | | 43/42.3 |
| 3,389,490 A * | 6/1968 | Peters et al. | | 43/42.26 |
| 3,405,475 A * | 10/1968 | Ross | | 43/42.28 |
| 3,438,144 A * | 4/1969 | Lincoln | | 43/42.15 |
| 3,600,838 A * | 8/1971 | Bablick | | 43/44.8 |
| 3,735,518 A * | 5/1973 | Kleine et al. | | 43/42.24 |
| 3,854,233 A * | 12/1974 | Browning, III | | 43/42.29 |
| 3,863,380 A * | 2/1975 | Purlia | | 43/17.6 |
| 3,958,355 A * | 5/1976 | Findon | | 43/44.2 |
| 3,992,801 A * | 11/1976 | McDiarmid et al. | | 43/44.8 |
| 4,177,597 A * | 12/1979 | Thomassin | | 43/42.3 |
| 4,422,260 A * | 12/1983 | Perrick | | 43/44.8 |
| 4,471,558 A * | 9/1984 | Garcia | | 43/44.4 |
| 4,516,352 A * | 5/1985 | Firmin | | 43/42.26 |
| 4,530,179 A * | 7/1985 | Larew | | 43/42.3 |
| 4,550,938 A * | 11/1985 | Nakanishi et al. | | 43/44.98 |
| 4,589,221 A * | 5/1986 | Mattison | | 43/42.24 |
| 4,672,768 A * | 6/1987 | Pippert | | 43/42.09 |
| 4,741,120 A * | 5/1988 | Cota et al. | | 43/17.6 |
| 4,750,290 A * | 6/1988 | Renaud | | 43/42.29 |
| 4,771,567 A * | 9/1988 | Cannon | | 43/42.26 |
| 4,791,749 A * | 12/1988 | Stazo | | 43/42.29 |
| 4,815,233 A * | 3/1989 | Pingel | | 43/42.11 |
| 4,848,023 A * | 7/1989 | Ryder et al. | | 43/44.2 |
| 4,862,630 A * | 9/1989 | Welch | | 43/42.26 |
| 4,881,341 A * | 11/1989 | Dickey et al. | | 43/42.12 |
| 4,912,871 A * | 4/1990 | Brady | | 43/42.26 |
| 4,953,319 A * | 9/1990 | Kasper et al. | | 43/42.24 |
| 4,964,234 A * | 10/1990 | Davey | | 43/44.2 |
| 4,993,183 A * | 2/1991 | Carver | | 43/42.24 |
| 4,998,372 A * | 3/1991 | Reed | | 43/42.24 |
| 4,998,373 A * | 3/1991 | Braswell | | 43/42.37 |
| 5,090,151 A * | 2/1992 | Salminen | | 43/42.36 |
| 5,228,230 A * | 7/1993 | Vaught | | 43/42.26 |
| 5,301,452 A * | 4/1994 | Roach | | 43/42.29 |
| 5,353,540 A * | 10/1994 | Ward | | 43/42.26 |
| 5,408,780 A * | 4/1995 | Chambers, Sr. | | 43/42.24 |
| 5,438,790 A * | 8/1995 | Rigney | | 43/42.24 |
| 5,551,185 A * | 9/1996 | Reed | | 43/42.39 |
| 5,625,975 A * | 5/1997 | Imes | | 43/42.28 |
| 5,630,289 A * | 5/1997 | Dotson | | 43/42.28 |
| 5,822,913 A * | 10/1998 | Lau | | 43/42.28 |
| 5,915,944 A * | 6/1999 | Strunk | | 43/42.26 |
| 5,953,850 A * | 9/1999 | Hnizdor | | 43/42.26 |
| 5,974,724 A * | 11/1999 | Pope | | 43/42.26 |
| 6,032,400 A * | 3/2000 | Lau | | 43/42.26 |
| 6,041,540 A * | 3/2000 | Potts | | 43/42.24 |
| 6,082,038 A * | 7/2000 | Link | | 43/42.3 |
| 6,122,856 A * | 9/2000 | Hnizdor | | 43/42.28 |
| 6,141,900 A * | 11/2000 | Rudolph | | 43/42.24 |
| 6,212,818 B1 * | 4/2001 | Huddleston | | 43/42.37 |
| 6,219,956 B1 * | 4/2001 | Hurt | | 43/44.4 |
| 6,237,275 B1 * | 5/2001 | Chambers, Sr. | | 43/42.29 |
| 6,240,672 B1 * | 6/2001 | Huppert | | 43/44.8 |
| 6,266,915 B1 * | 7/2001 | Stump | | 43/42.24 |
| 6,266,916 B1 * | 7/2001 | Dugan | | 43/42.37 |
| D457,219 S * | 5/2002 | Mooneyham et al. | | D22/132 |
| 6,393,757 B2 * | 5/2002 | Bomann | | 43/42.24 |
| 6,405,477 B1 * | 6/2002 | Huppert | | 43/44.8 |
| 6,408,566 B1 * | 6/2002 | Ward, Sr. | | 43/42.26 |
| 6,505,432 B2 * | 1/2003 | Brinkman | | 43/42.37 |
| 6,546,663 B1 * | 4/2003 | Signitzer et al. | | 43/42.28 |
| 6,560,915 B2 * | 5/2003 | Downey | | 43/42.39 |
| 6,634,135 B1 * | 10/2003 | Rydell | | 43/42.29 |
| 6,860,058 B2 * | 3/2005 | Ito | | 43/42.28 |
| 6,865,842 B2 * | 3/2005 | Brinkman | | 43/42.36 |
| 6,931,785 B1 * | 8/2005 | Johnson | | 43/42.26 |
| 7,010,881 B2 * | 3/2006 | Altman | | 43/42.13 |
| 7,080,476 B2 * | 7/2006 | King | | 43/42.28 |
| 7,168,203 B2 * | 1/2007 | Chambers, Sr. | | 43/42.28 |
| 7,185,457 B2 * | 3/2007 | Nichols | | 43/42.39 |
| 7,272,910 B2 * | 9/2007 | Mell | | 43/42.26 |
| 7,308,773 B1 * | 12/2007 | McNaughton | | 43/42.26 |
| 2001/0047609 A1 * | 12/2001 | Orgeron et al. | | 43/42.31 |
| 2003/0074829 A1 * | 4/2003 | Brinkman | | 43/42.36 |
| 2004/0006908 A1 * | 1/2004 | Essad et al. | | 43/42.13 |
| 2005/0193620 A1 * | 9/2005 | King | | 43/42.26 |
| 2006/0037231 A1 * | 2/2006 | Moore | | 43/42.28 |
| 2006/0037232 A1 * | 2/2006 | Gill | | 43/42.39 |
| 2007/0144054 A1 * | 6/2007 | Warczok et al. | | 43/42.24 |

FOREIGN PATENT DOCUMENTS

| | | | |
|---|---|---|---|
| FR | 2845565 A1 * | 4/2004 | |
| FR | 2898013 A1 * | 9/2007 | |
| JP | 09107848 A * | 4/1997 | |
| JP | 2001231406 A * | 8/2001 | |
| JP | 2001327236 A * | 11/2001 | |
| JP | 2002153166 A * | 5/2002 | |
| JP | 2002204634 A * | 7/2002 | |
| JP | 2002209476 A * | 7/2002 | |
| JP | 2002218883 A * | 8/2002 | |
| JP | 2003265073 A * | 9/2003 | |
| JP | 2003304784 A * | 10/2003 | |
| JP | 2003310101 A * | 11/2003 | |
| JP | 2003310104 A * | 11/2003 | |
| JP | 2004081017 A * | 3/2004 | |
| JP | 2004215635 A * | 8/2004 | |
| JP | 2005095067 A * | 4/2005 | |
| JP | 2005341826 A * | 12/2005 | |
| JP | 2006149328 A * | 6/2006 | |

* cited by examiner

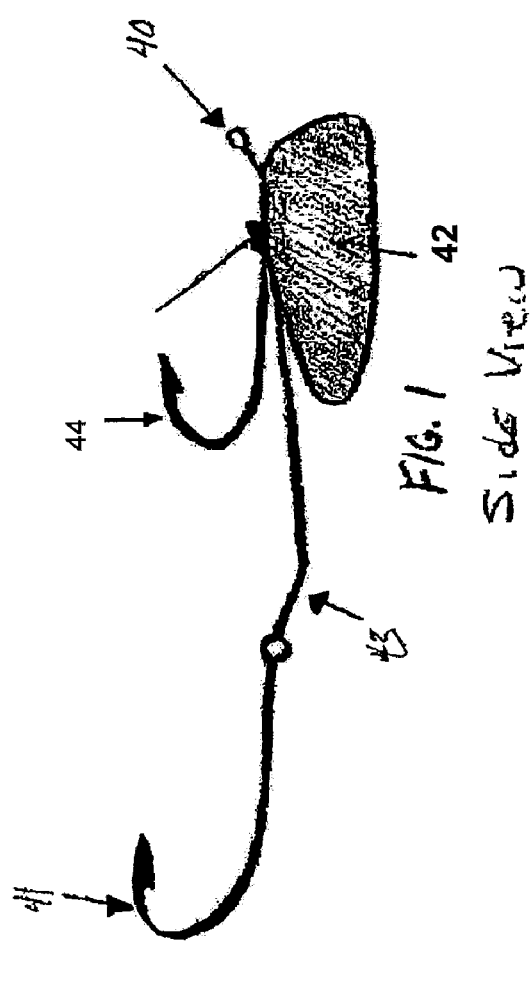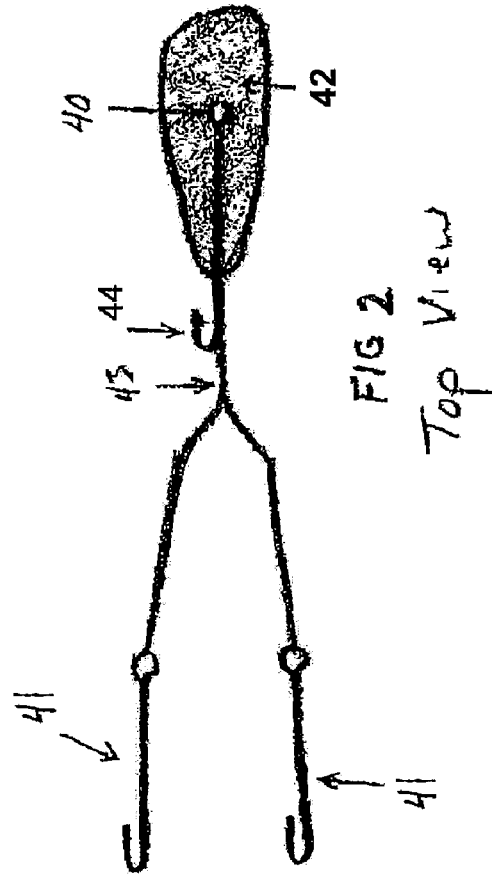

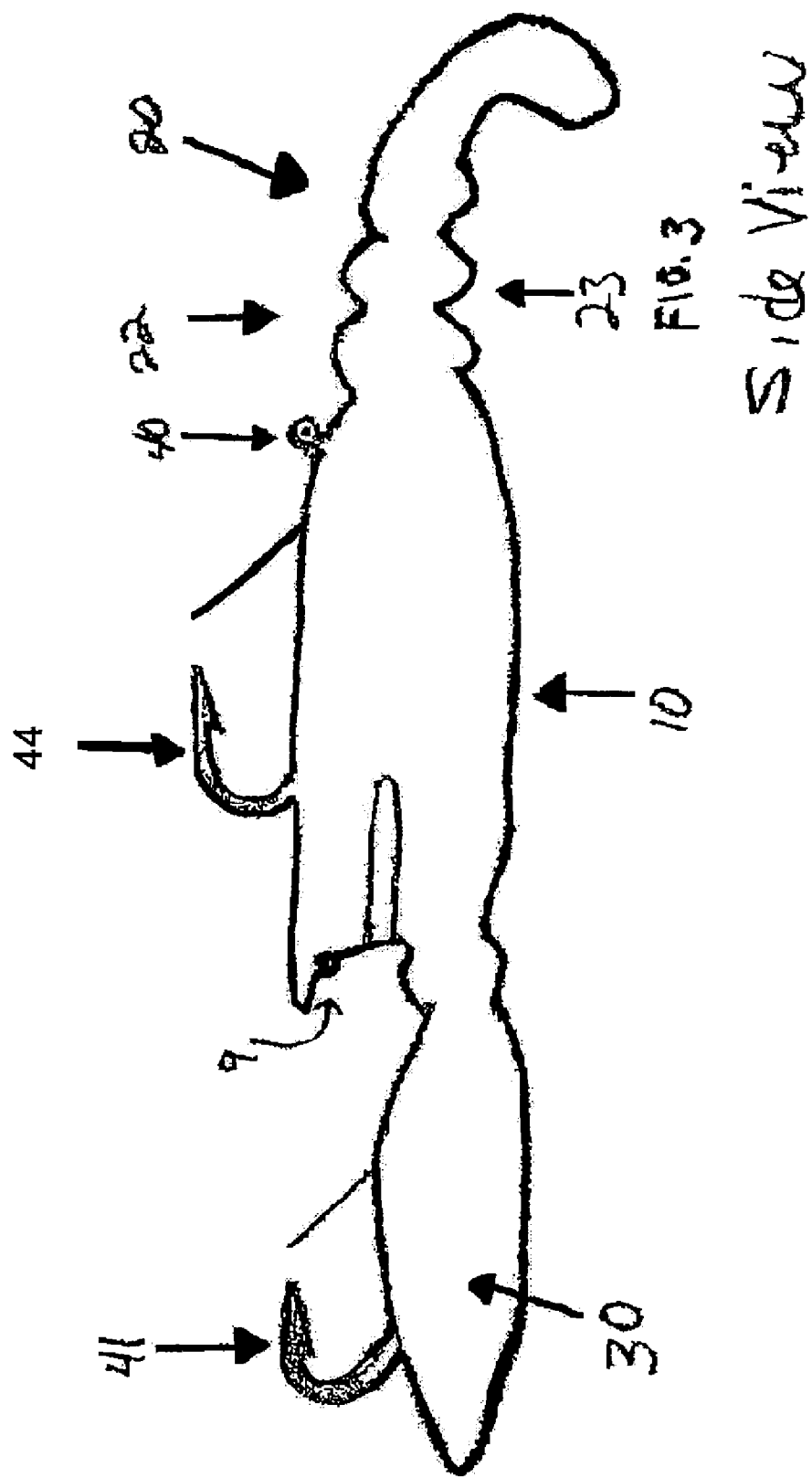

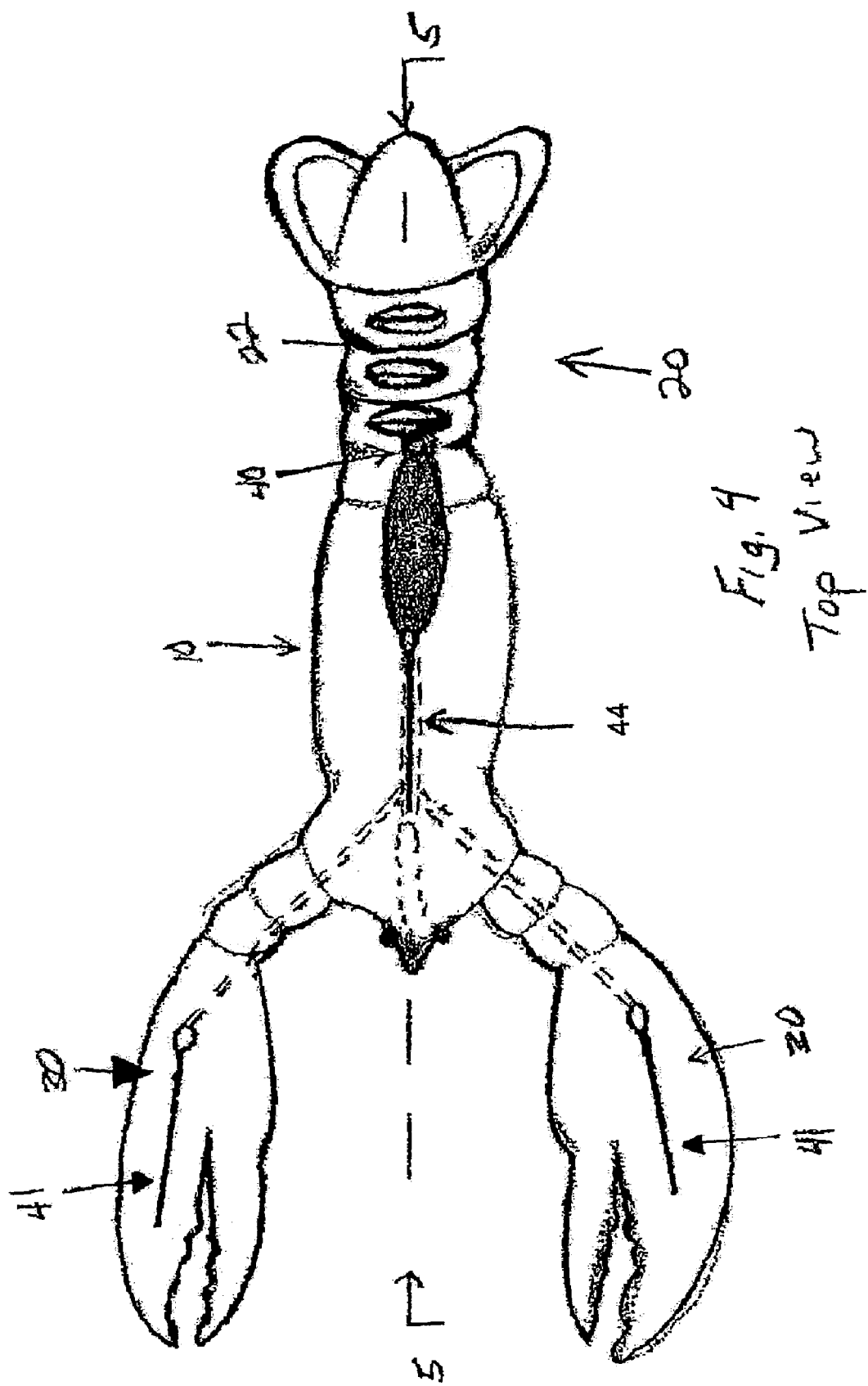

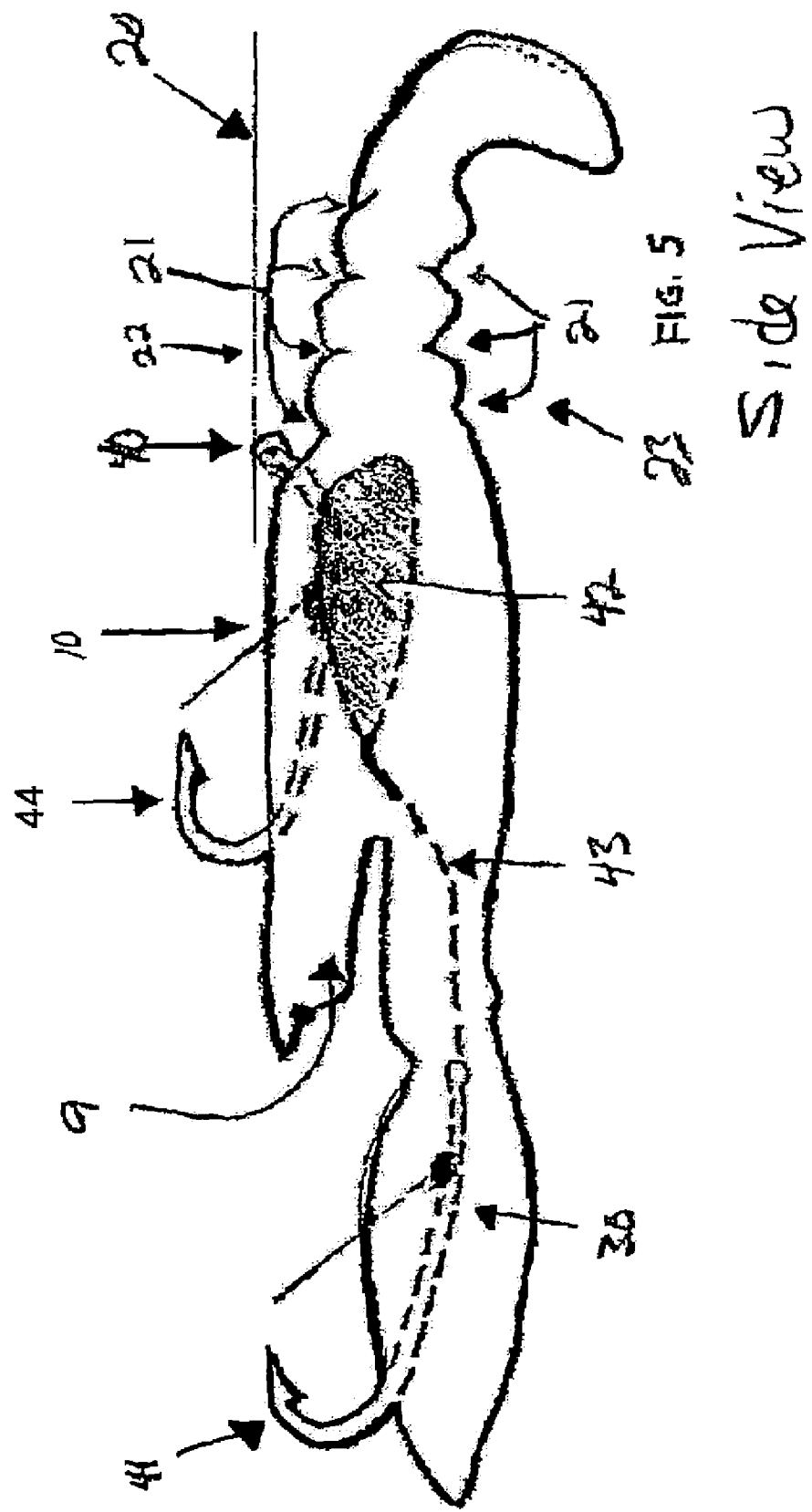
Fig. 5 Side View

ARTIFICIAL FISHING LURE

This application claims the benefit of U.S. Provisional Patent Application Ser. No. 60/543,321, filed Feb. 9, 2004, which is incorporated herein by reference in its entirety.

BACKGROUND OF THE INVENTION

This invention relates generally to artificial fishing lures and in particular to fishing lures designed to capitalize on a predatory fish's apparent ability to identify and attack specific types of sea life. While there is an abundance of artificial fishing lures available to the general public, most of these lures attempt to imitate fish that are swimming in open waters, and most attempt to imitate the random, erratic movements such fish. Few such lures attempt to imitate the movements of creatures such as lobsters trolling the floor of a body of water.

SUMMARY OF THE INVENTION

The invention disclosed herein relates to a fishing lure of the type that imitates the natural movements of a lobster. While the embodiment described herein relates to an American lobster, it will be appreciated that the scope of the invention includes any type of lobster or any species of bottom dweller. Moreover, while the embodiment described herein relates to a lure of a particular size, but it will be appreciated by those in the art that the lure can actually vary in size.

In the depicted embodiment, a weight is formed inside what appears to be the body of the lobster. It is located near the posterior of the body, adjacent to where the body appears to join the tail. Near the same location, an eyelet protrudes from the body, such that the user can attach a fishing line. The locations of the eyelet and weight allow the lure to appear to move in a realistic manner when the user casts the lure. Instead of dropping in a rather haphazard fashion or spinning like a propeller upon descent, the present invention will drop in a manner that appears much more consistent with an actual live lobster. Furthermore, as the user is dragging the lure along the floor of the body of water in an attempt to imitate a trolling lobster, the location of the weight and eyelet helps prevent the lure from flipping over as it encounters rough terrain.

The body, tail and appendages are formed from a soft, flexible, rubber-like material such as a flexible vinyl plastisol, polyvinylchloride (PVC) or other similar material. Black beads are implanted into the body near the head end to simulate the eyes of the lobster. Small, asymmetrical pieces of glitter or other reflective material are sprinkled throughout the body, tail and appendages. This glitter serves to gain the predatory fish's attention. A small hole is formed in the body near the head of the fishing lure. The hole can be used to attach a glow stick or other luminescent object or an object that emits a scent.

The predatory fish this lure targets tend to attack lobsters at the head and claw portions. Therefore, hooks protrude at each of these locations. It is also within the scope of this invention to have the lure resemble a Spiny lobster. Predatory fish attack this type of lobster at the head and antennae portions. Therefore, in this embodiment, hooks protrude at the head and antennae portions. For convenience, only the American lobster embodiment will be discussed in detail, but it will be appreciated by those in the art that the descriptions of the appendages applies to any appendage, such as antennae, claws, legs, etc.

The predatory fish that are attracted to this type of lure can be rather large. Because the preferred embodiment resembles a lobster, the cross-sectional area of the appendages at the point they join the body is relatively small. In addition, the rubbery material forming the body, appendages and tail has a relatively low tensile strength. Consequently, the body and appendages alone do not have the strength to withstand the forces needed to actually capture the predatory fish. Therefore, the body and appendages are formed around a skeletal-like frame. The hooks are attached directly to this frame, rather than merely to the material the body is made from. This significantly improves the strength of the lure, and allows the user to capture the predatory fish without losing one of the appendages from the lure.

In addition, the tail in the present embodiment has several notches on its top and bottom sides. These notches work in concert, such that when the lure is being dragged, the tail curls under the body in a fashion that is consistent with an actual lobster. It is also within the scope of this invention that the notches can be formed so as to pop and splash while the invention is on the surface. This popping and splashing action will additionally attract predatory fish.

BRIEF DESCRIPTION OF THE DRAWINGS

FIG. 1 is a side view of the skeletal frame of the preferred embodiment.

FIG. 2 is a top view of the skeletal frame of the preferred embodiment.

FIG. 3 is a side view of the preferred embodiment.

FIG. 4 is a top view of the preferred embodiment.

FIG. 5 is a cross sectional view of the preferred embodiment taken along line 5-5 of FIG. 4.

DETAILED DESCRIPTION OF THE DRAWINGS

FIGS. 1 through 5 depict an embodiment of the invention. It will be understood that the depicted embodiment is exemplary and not limiting. Identical structures are given identical numerals in each figure.

FIGS. 1 and 2 show a side view and top view of skeletal frame 43, respectively. Two hooks 41, central hook 44 and eyelet 40 are each attached to skeletal frame 43. Frame 43 can be made of any suitable material such as stainless steel wire or braided wire, either of which may be formed as a unit or welded together. Frame 43, as shown in FIG. 2, is formed in a generally 'Y' shape. Central hook 44 is attached near the junction of the 'Y' and eyelet 40. Weight 42 can be located between and below central hook 44 and eyelet 40. Hooks 41 are preferably of weed-less type hooks which are well known in the art. It will be understood by those in the art that similar types of hooks are within the scope of this invention. Weedless hooks will prevent seaweed and other types of debris from becoming entangled in hooks 41 which would render them inoperable.

PVC or another similar soft, flexible material is injected into a mold around frame 43 to form a body, including a tail end 20 and appendages 30. While each of the figures depicts appendages 30 as claws, it will be appreciated that appendages 30 are not limited to claw shapes, but may be antennae, both antennae and claws, etc. Furthermore, the molded plastic may include scent, glitter or other attention-getting attributes to make the lure more attractive to the predatory fish.

In use, a predatory fish will most likely attack the lure at either one of appendages 30 or at head end 9 of the body. Therefore, one of hooks 41 protrude at each of these locations.

FIGS. 3 and 4 show body 10 and appendages 30 formed around skeletal frame 43 of lure 5. Hooks 41 are joined to skeletal frame 43. In this way, if a predatory fish strikes one of appendages 30, engaging a hook 41, skeletal frame 43 will assume and withstand the forces acting on the lure caused by the thrashing of the predatory fish and the pull of the user.

FIG. 5 shows a cross sectional view of the preferred embodiment along line 5-5 of FIG. 4. Weight 42 is shown in the preferred location, between and below central hook 44 and eyelet 40. Also, as shown in FIG. 5, no part of frame 43 extends into tail end 20 in the depicted embodiment; tail end 20 is formed exclusively of the plastic that forms body 10 and appendages 30.

Notches 21 are formed into the top side 22 and bottom side 23 of tail end 20. These notches work in concert, such that when a user is dragging the lure along the bottom of the ocean or other body of water, hydrodynamic and frictional forces compel tail end 20 to curl under body 10. This action reproduces that natural motion of a fleeing lobster, and further entices a predatory fish to attack. Notches 21 can also be formed such that they will create a popping sound when lure 5 is at the surface of a body of water. This popping sound further emulates an actual lobster and entices predatory fish to attack.

In the depicted embodiment, eyelet 40 protrudes from body 10 near tail end 20. Also, weight 42 is located in body 10 near tail end 20. When a live lobster dives from any point in a body of water toward the bottom of that body of water, it dives head first. Because of the location of eyelet 40 and weight 42, when the user first casts the present invention, it will fall to the bottom in the same manner.

Also because of the location of eyelet 40 and weight 42, when the user drags the present invention along the bottom, it will not readily flip over if it encounters rough terrain, but will instead remain upright, furthering the illusion that the lure is, in fact, a live lobster.

While specific embodiments of the invention have been described in detail, it will be appreciated by those skilled in the art that various modifications and alternatives to those details could be developed in light of the overall teachings of the disclosure. Accordingly, the particular arrangements disclosed herein are meant to be illustrative only and not limiting as to the scope of the invention which is to be given the full breadth of the appended claims and any equivalents thereof.

What is claimed is:

1. A fishing lure comprising:
    a generally Y-shaped frame formed of wire;
    a body formed about the frame, the body comprising:
        a torso portion with a head end;
        a tail integrally formed with and extending from the torso portion opposite the head end, the head end and tail defining a longitudinal axis of the body there between the tail comprising a top side, a bottom side, a series of toroidal segments extending transversely across the longitudinal axis of the body, an array of notches formed on the top side, and a corresponding array of notches formed on the bottom side, wherein the notches work in concert such that the tail will react to any forces by curling under the fishing lure; and
        a pair of generally identical appendages integrally formed with and extending from the head end of the torso portion;
    a weight attached to the frame and positioned with the body;
    a plurality of hooks joined to the frame, wherein each of the plurality of hooks has one end protruding from the body; and
    an eyelet attached to the frame and protruding from the torso portion adjacent to the tail;
    wherein said generally Y-shaped frame has a first portion extending generally parallel to the longitudinal axis of the body, a second portion, and a third portion, said first portion having a first end and a second opposing end, said second and third portions having respective first ends connected at second end of said first portion and diverging therefrom toward respective second ends thereof, two of said plurality of hooks being joined to the frame at the second ends of said second and the third portions and protruding from said pair of generally identical appendages, a third one of the plurality of hooks protrudes from the head end of the torso portion, and the eyelet is both attached to the frame at the first end of the first portion and located between the series of toroidal segments and the third one of the plurality of hooks along the longitudinal axis of the body.

2. The fishing lure as set forth in claim 1, wherein the frame is comprised of braided wire.

3. The fishing lure as set forth in claim 2, wherein the weight is positioned adjacent to the tail.

4. The fishing lure as set forth in claim 1, wherein the weight is positioned within the torso portion adjacent to the tail.

5. The fishing lure as set forth in claim 1, wherein the plurality of hooks are weed-less type hooks.

* * * * *

UNITED STATES PATENT AND TRADEMARK OFFICE
CERTIFICATE OF CORRECTION

| | |
|---|---|
| PATENT NO. | : 7,493,725 B2 |
| APPLICATION NO. | : 11/051686 |
| DATED | : February 24, 2009 |
| INVENTOR(S) | : Mark Sampson |

Page 1 of 1

It is certified that error appears in the above-identified patent and that said Letters Patent is hereby corrected as shown below:

Col. 3 Claim 1, Line 14, delete "with" and replace with --within--.

Signed and Sealed this

Twenty-sixth Day of May, 2009

JOHN DOLL
*Acting Director of the United States Patent and Trademark Office*